United States Patent Office 3,138,602
Patented June 23, 1964

3,138,602
AMINE-DECABORANE ADDUCTS AND
PREPARATION THEREOF
John W. Szymanski, Niagara Falls, and Samuel I. Trotz, Tonawanda, N.Y., assignors to Olin Mathieson Chemical Corporation, a corporation of Virginia
No Drawing. Filed Nov. 16, 1959, Ser. No. 853,370
12 Claims. (Cl. 260—293)

This invention relates to solid recation products of certain amines and decaborane.

The solid products of this invention when incorporated with suitable oxidizers, such as ammonium perchlorate, potassium perchlorate, sodium perchlorate, ammonium nitrate and etc., yield solid propellants suitable for rocket power plants and other jet propelled devices. Such propellants burn with high flame speeds, have high heats of combustion and are of the high specific impulse type. Probably the single most important factor in determining the performance of a propellant charge is the specific impulse, and appreciable increases in performance will result from the use of the higher specific impulse materials. The products of this invention when incorporated with oxidizers are capable of being formed into a wide variety of grains, tablets and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

Several investigations have been reported concerning the simple acid-base adduct formation between decaborane and amines. Note, for example, the article reporting decaboranedimethylamine adducts by S. J. Fitch and A. W. Laubengayer, J. Am. Chem. Soc., vol. 80, page 5911–5913 (1958). The simple acid-base reaction yields adducts whose compositions are dependent on the temperature of the reaction mixture and the ratio of amine to decaborane. The amine molecules may be removed in a somewhat stepwise manner by warming and evacuation. Apparently the monamine and diamine adducts are quite stable at ambient temperatures but may be decomposed into the original components at slightly elevated temperatures. It is possible to regenerate the decaborane quantitatively by displacement with hydrogen chloride, and presumably other strong acids will effect the same displacement.

It has been found that in the presence of excess amine and heat, an additional reaction occurs according to the following equations:

(1)
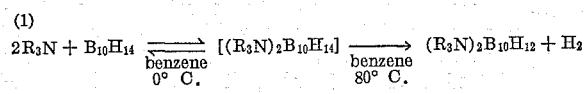

or (2)
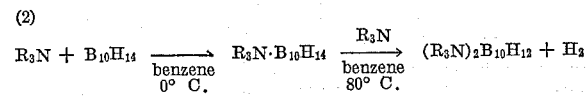

The reaction involves the loss of hydrogen and the formation of the very stable bis-aminodecaborane compound. The compounds are usually white, crystalline materials with high melting points. They are quite insoluble in the common aliphatic hydrocarbons and in ether, but demonstrate moderate solubility in alcohols and acetone from which they may be crystallized. The degradative alcoholysis which occurs with decaborane at room temperature does not take place in the case of these diaminodecaborane compounds even at the reflux temperature of the alcohol.

In the normal course of synthesis, one mole of hydrogen is evolved for each mole of decaborane used. The fact that the loss of hydrogen occurs in the case of the tertiary amines as well as primary and secondary amines suggests that the amino hydrogen atom is not involved but that the hydrogen atoms evolved originate exclusively from the decaborane.

The infrared spectra of mono amine adducts, bis amine adducts and bis amino compounds, when compared to the spectrum of decaborane itself, exhibit definite alterations. The most obvious differences occur in the regions ascribed to the bridge hydrogen B-H stretch frequencies, normally a doublet at 5.20 and 5.30$\mu$ and a triplet over the 6.40-6.80$\mu$ region. The B-H absorption band normally at 3.85$\mu$ is displaced slightly to about 4.0$\mu$.

Hence, the solid reaction products of this invention are prepared by reacting decaborane with a primary, secondary or tertiary amine at a temperature above about 75° C.

Suitable primary amines include, for example, methylamine, ethylamine, n-propylamine, isopropylamine, n-butylamine, isobutylamine, sec-butylamine, tert-butylamine, n-amylamine, isoamylamine, 2-aminopentane, tert-amylamine, n-hexylamine and n-octylamine. Suitable secondary amines include, for example, dimethylamine, diethylamine, di-n-propylamine, diisopropylamine, di-n-butylamine, diisobutylamine, di-sec-butylamine, methylethylamine, piperidine, morpholine and the like. Suitable tertiary amines include for example, trimethylamine, triethylamine, tri-n-propylamine, ethyldimethylamine, n-propyldimethylamine, methyldiethylamine, 2-chloroethyldimethylamine, tri-n-butylamine, triisobutylamine, tri-n-amylamine, triisoamylamine, and the like.

The ratio of reactants can be varied widely, generally being in the range 2 to 20 moles of amine per mole of decaborane, preferably 3 to 10:1. The reaction temperature can vary from about 75° C. to 150° C. and the pressure can vary from subatmospheric to several atmospheres, although atmospheric pressure reactions are convenient. The reaction to go to completion generally requires from one to fifty hours depending upon the ratio of reactants, the particular reactants utilized, and the temperature and pressure employed. Hydrogen is evolved in the amount of one mole per mole of decaborane.

Although the reaction will proceed in the absence of a solvent, best results are obtained by carrying out the reaction in a solvent common for the reactants but inert with respect to the reactants. Such solvents include aliphatic hydrocarbon solvents such as n-pentane, hexane and heptane, aromatic hydrocarbon solvents such as benzene, toluene and xylene, cycloaliphatic solvents such as cyclohexane and methylcyclopentane and oxygenated organic solvents such as dioxane, ethyl acetate, and diisopropyl ether. Dioxane and ethyl acetate form shock sensitive solutions with decaborane and so are less favorable solvents. The amount of solvent can vary widely but generally ranges up to about 70 times the weight of the reactants.

The process of the invention is illustrated in detail by the following examples which are to be considered not limitative.

EXAMPLE I

In a 500 ml., three-necked, round bottomed flask, were placed 12.2 g. of decaborane (0.1 mole) dissolved in 300 ml. of benzene. The flask was fitted with a dewar-type condenser, cooled by a Dry-Ice acetone mixture, and a dropping funnel topped by a similar Dry-Ice condenser. Trimethyl amine was condensed into the dropping funnel to the extent of 60 ml., slightly in excess of 0.6 mole.

The benzene solution of decaborane was then maintained at 0° C. and stirred with a magnetic stirrer while the liquefied amine was added dropwise over a one hour period. During the addition of the amine a white precipitate formed which turned light green on continued amine addition. The precipitate appeared to go into solution for the most part during the later stages of amine addition. When the final reaction mixture was permitted to warm to room temperature, a white crystalline material was formed. A portion of this material was removed, washed with benzene, and submitted as a sample for infrared analysis. The body of the reaction mixture was then heated slowly to the reflux temperature of benzene and the volatile materials which were evolved passed through Dry-Ice and liquid nitrogen traps and into a "wet test meter." Thirty-one ml. of trimethylamine were collected and 2870 ml. of hydrogen were measured over a 12 hour period.

The reaction mixture was then cooled to room temperature and filtered. The solid obtained was washed three times with benzene and three times with anhydrous diethyl ether. The crude product weighed 18.5 g. It was found that a portion of this final solid could be extracted with acetone. Approximately 23 percent of the solid reaction mixture was insoluble in acetone. The extracted portion was recrystallized from acetone and samples submitted for chemical analysis of boron and nitrogen as well as for infrared analysis.

Calculated for $B_{10}H_{12}[(CH_3)_3N]_2$: B, 45.74; N, 11.84. Found: B, 45.5; N, 12.39.

There are characteristic differences between the infrared spectra of decaborane, the amine adduct, and the amino compound.

EXAMPLE II

To 1.2 g. of decaborane (0.01 mole) in 25 ml. of benzene were added 10 ml. of condensed trimethylamine while the mixture was maintained at 0° C. Slight yellowing of the solution occurred as the amine was introduced. The large amount of precipitate initially formed was converted to a yellowish oil as the excess amine was added. The mixture was then heated and the excess amine distilled while the non-condensable gas was measured.

The net volume of hydrogen evolved was measured as 228 ml. (204 ml. S.T.P.). There was an obvious cessation of gas evolution at a point which corresponded closely to one mole of hydrogen per mole of decaborane. Evaporation of the solvent left a solid, slightly yellow in color, weighing 2.3 g., 96 percent of theoretical.

This product was purified by recrystallizations from n-butanol and the identity was confirmed by elemental analysis. Comparison of the infrared spectra of the purified and crude materials indicated that the product, as isolated from the reaction mixture, was nearly pure.

Calculated for $B_{10}C_6H_{30}N_2$: B, 45.36; N, 11.75. Found: B, 45.5, 44.9; N, 12.45, 12.24.

EXAMPLES III THROUGH VI

In a manner similar to that described in Examples I and II, decaborane was reacted respectively with dimethylamine, triethylamine, piperidine, and 2-chloroethyldimethylamine. The pertinent data are given in Table I below:

There was a tendency on the part of some of the bis-amino compounds to crystallize with solvent of crystallization. In the case of the piperidino compound, the monobenzenate was isolated and identified. The solvent was easily removed from the solvated materials by mild heating under vacuum for a few hours.

The boron containing solid materials produced by practicing the methods of this invention, can be employed as ingredients of solid propellant compositions in accordance with general procedures which are well understood in the art, inasmuch as the solids produced are readily oxidized using conventional solid oxidizers such as ammonium perchlorate, potassium perchlorate, sodium perchlorate and the like. In formulating a solid propellant composition employing one of the materials produced in accordance with the present invention, generally from 10 to 35 parts by weight of boron containing material and from 65 to 90 by weight of oxidizer are present in the final propellant composition. In the propellant, the oxidizer and the product of the present process are formulated in intimate admixture with each other, as by finely dividing each of the materials separately and thereafter intimately mixing them. The purpose of doing this, as the art is well aware, is to provide proper burning characteristics of the final propellant. In addition to the oxidizer and the oxidizable material, the final propellant can also contain an artificial resin or polymer such as the polyurethane type, the function of the resin being to give the propellant mechanical strength and at the same time improve its burning characteristics. Thus, in manufacturing a suitable propellant, proper proportions of finely divided oxidizer and finely divided boron containing material can be admixed with a high solids content solution of a resin such as that mentioned previously or a prepolymer of the resin, the proportions being such that the amount of resin is about 5 to 10 percent by weight based on the weight of oxidizer and boron compound. The ingredients are thoroughly mixed with the simultaneous removal of solvent, and following this the solvent free mixture is molded into the desired shape, as by extrusion. Thereafter the resin can be cured by resorting to heating at moderate temperatures. For further information concerning the formulation of solid propellant compositions, a reference is made to U.S. Patent 2,622,277 to Bonnell and U.S. Patent 2,646,596 to Thomas.

We claim:

1. A process for the preparation of solid reaction products of amines and decaborane which comprises reacting from 2 to 20 moles of an amine selected from the class consisting of lower alkyl amines, lower monochloroalkylamines, morpholine and piperidine per mole of decaborane with the evolution of hydrogen at a temperature above about 75° C. and up to about 150° C.

2. A process for the preparation of solid reaction products of amines and decaborane which comprises reacting from 2 to 20 moles of an amine selected from the class consisting of lower alkyl amines, lower monochloroalkyl-

*Table I*

BIS-AMINO DECABORANE COMPOUNDS

| Example | Compound | M.W. | Analysis Calc., percent | Analysis Found, percent | a M.P., °C. | Yield, Percent | Solvent of Crystallization |
|---|---|---|---|---|---|---|---|
| II | $B_{10}H_{12}[(CH_3)_3N]_2$ | 238.52 | B, 45.36 <br> N, 11.75 | 45.5, 44.9 <br> 12.45, 12.24 | 255 | 96 | n-Butanol. |
| III | $B_{10}H_{12}[(CH_3)_2NH]_2$ | 210.44 | B, 51.42 <br> N, 13.31 | 51.5 <br> 13.41, 13.38 | 229–230.5 | 50 | Do. |
| IV | $B_{10}H_{12}[(C_2H_5)_3N]_2$ | 322.68 | B, 33.53 <br> N, 8.68 | 32.9, 32.9 <br> 8.48, 8.45 | 223–224 | 92 | Acetone. |
| V | $B_{10}H_{12}[C_5H_{11}N]_2$ | 290.60 | B, 37.23 <br> N, 9.64 | 37.1, 37.3 <br> 9.88 | 234–235 | 95 | Benzene. |
| VI | $B_{10}H_{12}[ClCH_2CH_2-N(CH_3)_2]_2$ | 335.47 | B, 32.25 <br> C, 28.64 <br> H, 9.62 | 31.4, 31.9, 31.2 <br> 28.4, 30.2, 29.1 <br> 9.04, 9.54, 9.84 | 183 | 83.5 | Acetone. | a Determined in copper-block apparatus, uncorrected.

amines, morpholine and piperidine per mole of decaborane with the evolution of about one mole of hydrogen per mole of decaborane while the reactants are in admixture with a solvent inert with respect to the reactants at a temperature above about 75° C. and up to about 150° C.

3. The process of claim 2 wherein the amine is trimethylamine.

4. The process of claim 2 wherein the amine is dimethylamine.

5. The process of claim 2 wherein the amine is triethylamine.

6. The process of claim 2 wherein the amine is piperidine.

7. The process of claim 2 wherein the amine is 2-chloroethyldimethylamine.

8. The process of claim 1 wherein the amine is trimethylamine and the solvent is benzene.

9. The process of claim 1 wherein the amine is dimethylamine and the solvent is benzene.

10. The process of claim 1 wherein the amine is triethylamine and the solvent is benzene.

11. The process of claim 1 wherein the amine is piperidine and the solvent is benzene.

12. The process of claim 1 wherein the amine is 2-chloroethyldimethylamine and the solvent is benzene.

References Cited in the file of this patent

UNITED STATES PATENTS

| | | |
|---|---|---|
| 2,558,560 | Safford | June 26, 1951 |
| 2,961,444 | Aftandilian | Nov. 22, 1960 |

OTHER REFERENCES

Schechter et al.: "Boron Hydrides and Related Compounds," Callery Chemical Co., Jan. 8, 1951, p. 37.

Broadley: General Electric Co., Report No. 55248, Jan. 6, 1948, pp. 8, 9 and 11.

Fitch et al.: J. Am. Chem. Soc., vol. 80, pp. 5911–5913.

UNITED STATES PATENT OFFICE
CERTIFICATE OF CORRECTION

Patent No. 3,138,602　　　　　　　　　　　　　　　　June 23, 1964

John W. Szymanski et al.

It is hereby certified that error appears in the above numbered patent requiring correction and that the said Letters Patent should read as corrected below.

Column 1, line 41, for "monamine" read -- monoamine --; column 5, lines 16 and 18 and column 6, lines 1, 3 and 5, for the claim reference numeral "1", each occurrence, read -- 2 --.

Signed and sealed this 3rd day of November 1964.

(SEAL)
Attest:

ERNEST W. SWIDER
Attesting Officer

EDWARD J. BRENNER
Commissioner of Patents